United States Patent [19]

Nishiyama

[11] Patent Number: 4,866,566
[45] Date of Patent: Sep. 12, 1989

[54] CAPACITOR NETWORK

[75] Inventor: Katsumi Nishiyama, Nagaokakyo, Japan

[73] Assignee: Murata Manufacturing Co., Ltd., Kyoto, Japan

[21] Appl. No.: 229,151

[22] Filed: Aug. 5, 1988

[30] Foreign Application Priority Data

Sep. 9, 1987 [JP] Japan ............................ 62-137667[U]
Sep. 29, 1987 [JP] Japan ............................ 62-150015[U]

[51] Int. Cl.⁴ ........................ H01G 1/00; H01G 1/14; H05K 5/00
[52] U.S. Cl. .................................. 361/306; 174/52.2; 361/321
[58] Field of Search ........ 361/306 F, 306 DC, 321 F, 361/321 DC, 321 R, 433 S, 433 C, 402–404; 174/52 PE

[56] References Cited

U.S. PATENT DOCUMENTS

| | | |
|---|---|---|
| 2,828,454 | 3/1958 | Khouri . |
| 2,877,389 | 3/1959 | Wiener . |
| 3,256,499 | 6/1966 | Khouri et al. . |
| 3,745,430 | 7/1973 | Lunquist et al. ................ 361/302 X |
| 3,939,558 | 2/1976 | Riley ............................ 174/52 PE X |
| 4,090,231 | 5/1978 | Millard et al. ................. 361/433 C |
| 4,293,890 | 10/1981 | Varsane ...................... 361/321 F X |
| 4,701,830 | 10/1987 | Kato et al. ...................... 361/404 X |

Primary Examiner—Donald A. Griffin
Attorney, Agent, or Firm—Wenderoth, Lind & Ponack

[57] ABSTRACT

A capacitor network mounted to an input-output unit of a computer for eliminating noises, which disposes on one surface of a dielectric substrate a plurality of electrodes and on the other surface of the same at least one common electrode opposite to the plurality of electrodes so that lead terminals connected to each of the plurality of electrodes and earth terminals connected to the common electrode are formed of metal strip.

A pair of terminal blocks formed of the metal strip are inserted onto the dielectric substrate from both lateral sides thereof so as to hold the dielectric substrate between the lead terminals and the earth terminals, each terminal being fixed to the respective electrode, and thereafter the metal strip is cut off, thereby forming a three-terminal capacitor leading out the terminal from each electrode.

Since the lead terminals and earth terminals are connected to the metal strip, parts, such as the terminals, are easy to manufacture and assemble and areas of the electrodes and common electrode can be made larger, thereby obtaining effective electrostatic capacity.

5 Claims, 3 Drawing Sheets

CAPACITOR NETWORK

FIELD OF THE INVENTION

The present invention relates to a capacitor network mounted to, for example, an input-output unit of a computer for eliminating noises.

BACKGROUND OF THE INVENTION

Conventionally, a three-terminal capacitor, as shown in an equivalent circuit in FIG. 12, is so constructed that one of two electrodes 1 provided opposite to each other at both sides of a dielectric is connected to input-output lead terminals 2 and 3, the other to a lead terminal 4, the input-output terminals 2 and 3 being connected in series with the circuit, the terminal 4 being earthed. Accordingly, when a signal is input to the terminal 2 and output from that 3, noises contained in the signal are directed to the earth through the ground terminal 4.

The three-terminal capacitor, which is thus remarkably effective in elimination of noise, is often used for the input-output unit of the computer.

The conventional three-terminal capacitor, however, as shown in FIGS. 13 and 14, is formed in a discrete part of a capacitor body 5 independently molded of resin, from which input-output terminals 2 and 3 and an earth terminal 4 extend respectively, Hence, the three-terminal capacitor, when mounted on a circuit substrate, requires a large mounting gap, so that a mounting area for the three-terminal capacitor is too larger for high density of the circuit substrate and an input-output connector, thereby creating the problem in that the three-terminal capacitor is hard to mount near the input-output connector. Moreover, the same three-terminal capacitors must be mounted on every circuit, thereby creating the problem in that the mounting work is complicated and the efficiency is reduced.

OBJECTS OF THE INVENTION

A first object of the invention is to provide a capacitor network which is capable of forming a plurality of three-terminal capacitors in network and of being mounted in proximity to the input-output connector of high density.

A second object of the invention is to provide a capacitor network, whose mounting work is completed enough at one process so as to improve the productivity.

A third object of the invention is to provide a capacitor network which mechanically holds a dielectris substrate by a plurality of terminals so as to have strong structure, and manufacture and assemble parts, such as terminals, with ease to thereby be inexpensive to manufacture.

A fourth object of the invention is to provide a capacitor network which enlarges areas of electrodes and a common electrode so as to enable an effective electrostatic capacity to be enlarged and also to be reduced in coupling capacity between the ajacent capacitors.

A fifth object of the invention is to provide a cpacitor network which is further largely effective in the noise elimination effect.

These and other objects of the invention will become more apparent in the detailed description and examples which follow.

DETAILED DESCRIPTION OF THE INVENTION

Figure 1:
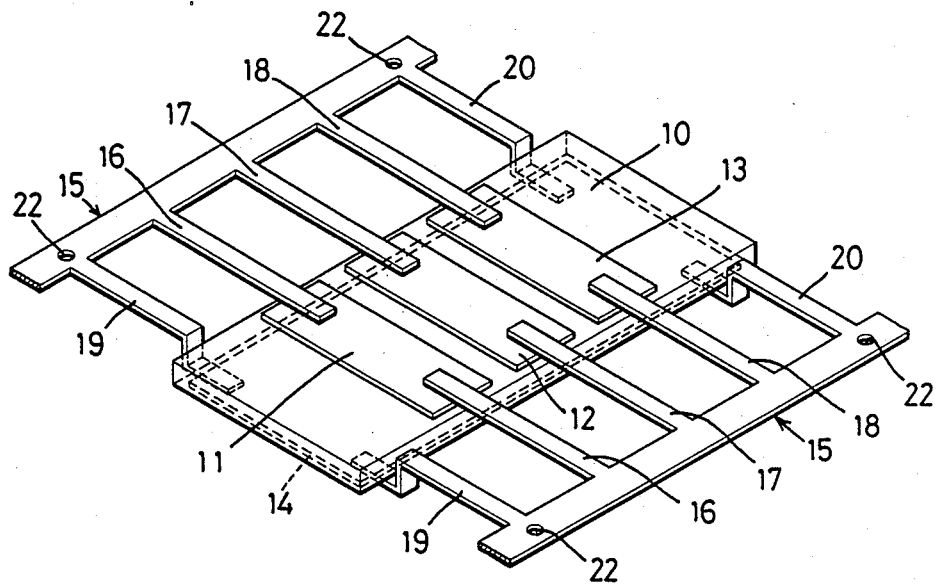
FIG. 1 is a perspective view of a first embodiment of a capacitor network of the invention, showing the principal portion thereof.
Figure 2:
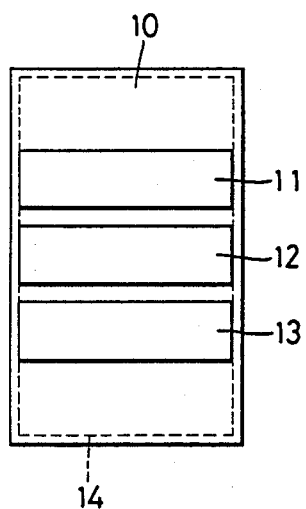
FIG. 2 is a front view of a plurality of data electrodes in FIG. 1.

In the first embodiment of the capacitor network of the invention shown in FIGS. 1 and 2, on one surface of a dielectric substrate 10 of ceramic are disposed a plurality of data electrodes 11, 12 and 13 and on the other surface of the same is disposed a common electrode 14 opposite to the data electrodes 11, 12 and 13, so that the electrode opposite portions form the electrostatic capacity. The data electrodes 11, 12 and 13 and common electrode 14 each comprise the dielectric substrate 10 and metallic foil of a good electric conductor put thereon, or a green sheet on which metal paste is screen-process-printed and baked and integral with the dielectric substrate 10.

A pair of terminal blocks 15 are insertably fixed onto the dielectric substrate 10 from both lateral sides thereof. Each terminal block 15 comprises lead terminals 16, 17 and 18 connected with the data electrodes 11, 12 and 13 disposed at one surface of the dielectric substrate 10 and earth terminals 19 and 20 connected with the common electrode 14 disposed at the other surface of the same, the terminals 16, 17 and 18 and earth terminals 19 and 20 extending in parallel to each other, spaced at about equal intervals, and integral with a metal strip.

In other words, the terminal block 15 is punched by a press continuously in a predetermined configuration and the earth terminals are bent, which block is supplied at every constant amount through bores 22 and mounted to the predetermined position at the dielectric substrate 10.

The pair of terminal blocks 15 are inserted on the dielectric substrate 10 from both lateral sides thereof and holds the substrate 10 at both lateral sides thereof between the lead terminals 16, 17 and 18 and the earth terminals 19 and 20 through spring forces of each terminal and thereafter the lead terminals 16, 17 and 18 are fixed to the date electrodes 11, 12 and 13 and the earth terminals 19 and 20 to the common electrode 14 by soldering or the like.

Figure 3:
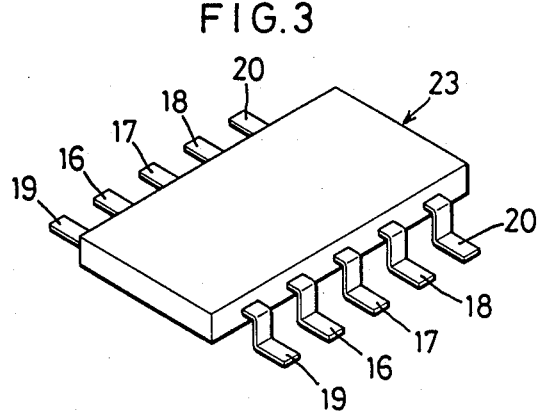
FIG. 3 is a perspective exterior view of the capacitor network shown in FIG. 1.

The dielectric substrate 10, on which the terminals 16 through 20 are mounted, is subjected to insulation processing at the entire dielectric substrate except for the terminal open end side, the insulating processing being resin molding or coating of insulating paint as shown in FIG. 3, and thereafter the needless portions of metal strip are cut off. Furthermore, the independently cut-off terminals 16 through 20 are properly bent, thereby forming a capacitor network 23 of a flat package type.

Figure 4:
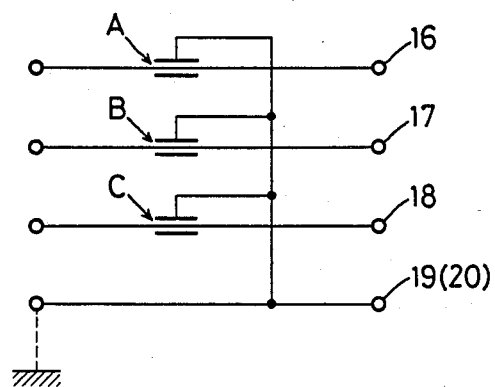
FIG. 4 is an equivalent circuit diagram of the capacitor network shown in FIG. 1, FIGS. 5, 6 and 7 are perspective views of other modified embodiments of the capacitor network of the invention, in which pairs of terminal blocks are modified in configuration.

An equivalent circuit of the capacitor network 23 thus obtained is a circuit constitution represented by a parallel circuit of three-terminal capacitors A, B and C as shown in FIG. 4, the lead terminals 16, 17 and 18 being connected to the data line at the circuit substrate, and the earth terminals 19 and 20 being earthed respectively. In addition, either one of the earth terminals 19 and 20 at need is made dummy.

Accordingly, for example, noises contained in the signal input to one lead terminal 16 is directed to the common electrode 14 through the data electrode 11 and then earthed, whereby the signal from which the noise is eliminated is output from the other lead terminal 16.

Thus, the first embodiment can realize the three-terminal capacitor formed in network, thereby enabling mounting of high density. Futhermore, the common electrode can be formed at the entire surface of dielectric substrate to reduce the coupling capacity between the adjacent electrodes causing deterioration in channel separation, whereby the plurality of data electrodes themselves can be formed widely on one surface of the dielectric substrate and thus the effecrive electrostatic capacity can be enlarged.

Accordingly, not only is the capacitor network mounted in proximity to the input-output connector of high density, but also the mounting work need only be carried out in one process to improve productivity. Moreover, the dielectric substrate is mechanically held by the plurality of terminals so as to have strong construction. Also parts, such as the terminals, are easy to produce and assemble, and the three-terminal capacitor inexpensive to produce and assembled in a network can be provided. Moreover, capacitor networks of the same outline can utilize a dielectric substrate greater in thickness in order to obtain an equal electrostatic capacity.

As the lead terminals and earth terminals connected to the metal strip hold therebetween the dielectric substrate and these terminals are fixed to the date electrodes and common electrode, the areas of each data electrode and common electrode can be made larger to thereby enlarge the effective electrostatic capacity. Moreover, the junction capacity between the adjacent terminals is also reducible.

In addition, the capacitor network of the invention is not limited to the above embodiment, but may variously be modified in a range of the principle of the invention. For example, as shown in FIG. 5, earth terminals 24 and 25 formed at a metal strip may be integrally connected at the utmost ends by a connector 26 and connected therethrough to the common electrode 14.

Figure 5:
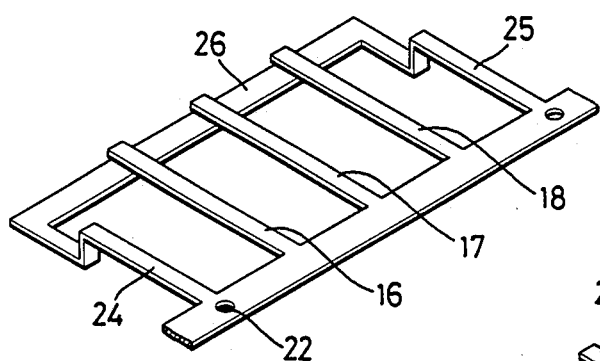

The embodiment in FIG. 5 can reduce the impedance of common electrode 14, and reinforces the capacitor network and dielectric substrate.

Figure 6:
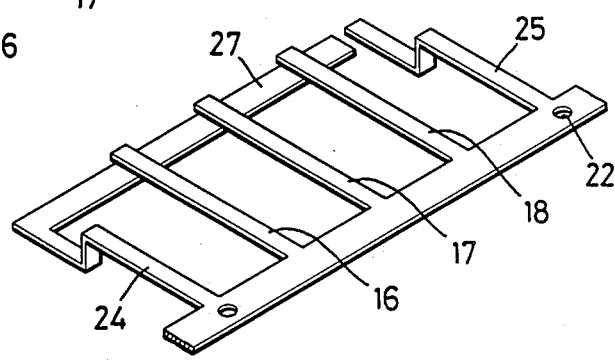

Also, the connector 26 for connecting the earth terminals 24 and 25 in FIG. 5 need not be inevitably integral therewith, but the earth terminal 25 may be cut off from a connector 27, as shown in FIG. 6.

Figure 7:
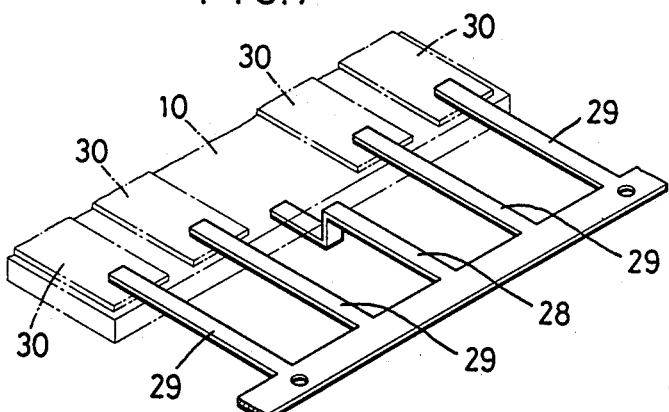

Furthermore, as shown in FIG. 7, an earth terminal 28 may be disposed at an approximate center of the terminal block with respect to lead terminals 29, and electrodes 30 for the data line may be disposed at both end sides of the dielectric substrate 10.

Figure 8:
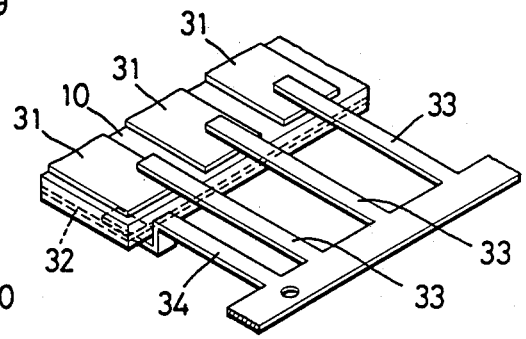
FIGS. 8 and 9 are perspective views further modified embodiments of the pairs of terminal blocks.

Besides this, as shown in FIG. 8, a large number of data electrodes 31 may be disposed throughout one surface of a dielectric substrate 10, a common electrode 32 may be disposed on the other surface of the same, and lead terminals 33 and an earth terminal 34 may be formed not to interfere with each other at the adjacent terminals, so that the lead terminals 33 and earth terminal 34 may hold therebetween the dielectric substrate 10 and be fixed to the data electrodes 31 and common electrode 32 respectively. Thus, effective use of dielectric substrate can be further expected.

Figure 9:
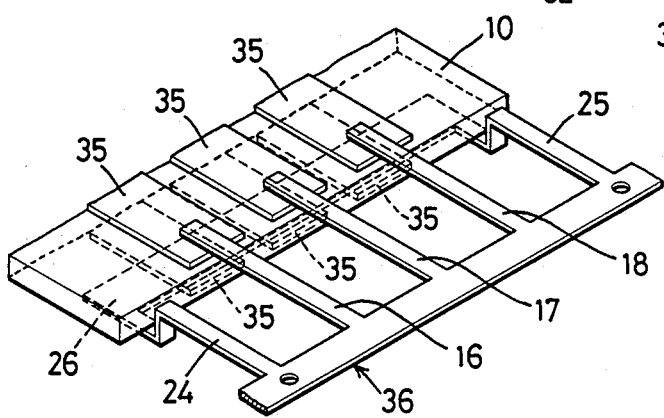

Alternatively, as shown in FIG. 9, a plurality of electrodes 35 may be disposed on both the surfaces of dielectric substrate 10 and opposite to each other, and a terminal block 36 provided with earth terminals 24 and 25 connected through a connector 26 as shown in FIG. 5 may be mounted on the dielectric substrate 10.

In the embodiment of FIG. 9, the electrodes 35 connected to each other through the connector 26 serve as the common electrode. Thus, when the terminal block is inserted onto the dielectric substrate on which the electrodes are formed, there is no need of considering both sides of the dielectric substrate 10, whereby the terminal block mounting work is easy to automatize and also a mounting mistake is eliminated.

Next, an explanation will be given of a second embodiment of the capacitor network shown in FIGS. 10 and 11.

In addition, in the second embodiment, the components the same as those in the first embodiment shown in FIGS. 1 through 9 will be designated by the same reference numerals, thereby omitting description thereof.

The second capacitor network is so constructed that a three terminal capacitor comprises data electrodes and a common electrode disposed on the dielectric substrate and opposite to each other, the data electrode being held between the common electrode and the earth conductor formed at the circuit substrate.

Accordingly, when a signal from the data circuit passes the data electrode through the lead terminals, noises contained in the signal are directed to the common electrode and earthed through the earth terminal and also through the earth conductor on the circuit substrate.

Figure 10:
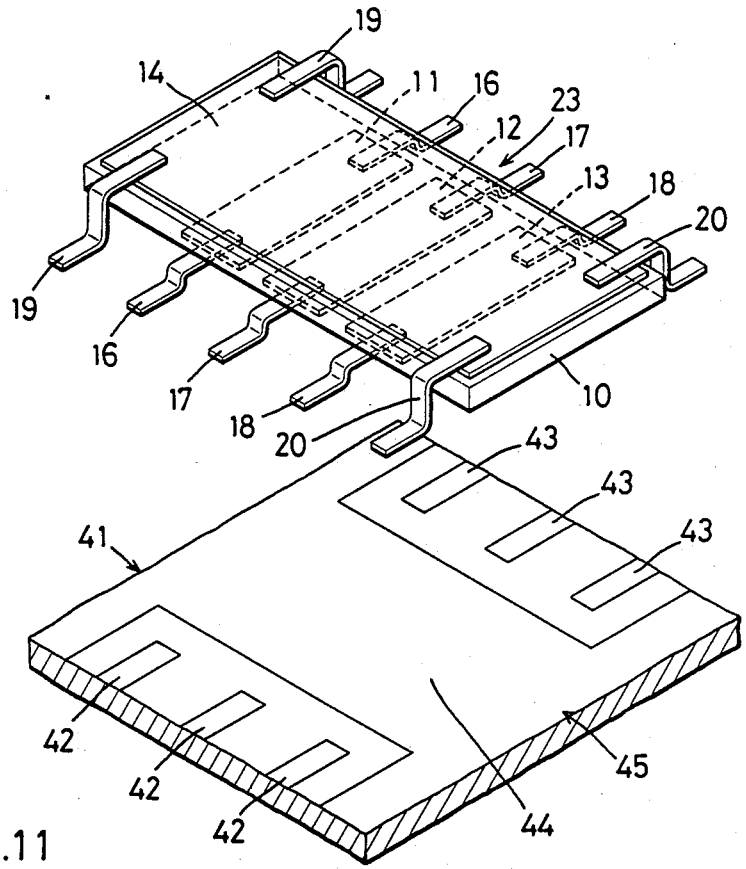
FIG. 10 is a perspective view of a second embodiment of the capacitor network of the invention, showing together a circuit substrate.

Concretely, as shown in FIG. 10, after the lead terminals 16, 17 and 18 and earth terminals 19 and 20 are connected to the substrate 10, the dielectric substrate 10, data electrodes 11, 12 and 13 and common electrode 14 are subjected to an insulating coating (not shown). The insulating coating is molded of epoxy resin or the like or formed by applying an insulating paint. In a capacitor network 23 formed as above-mentioned, the lead terminals 16, 17 and 18 and earth terminals 19 and 20 are bent toward the surface of dielectric substrate 10, on which the data electrodes 11, 12 and 13 are formed, so that the data electrodes are positioned at the circuit substrate side, whereby the capacitor network 23 is formed in a flat package type.

In addition, data circuits 42 and 43 for the date line on which the input-output signal flows and an earth conductor 45 having an earth electrode 44 are formed by screen process printing on a circuit substrate 41 on which the capacitor network 23 is mounted. The earth electrode 44 is nearly the same in configuration as the common electrode 14 at the capacitor network 23, formed at the position where the data circuits 42 and 43 are separated from each other and the earth conductor 45 is earthed.

Accordingly, the lead terminals 16, 17 and 18 at the capacitor network 23 are connected with the data circuits 42 and 43 at the circuit substrate 41 and the earth terminals 19 and 20 with the earth conductor 45, the data electrodes 11, 12 and 13 being sandwiched between the common electrode 14 and the earth electrode 44.

Figure 11:
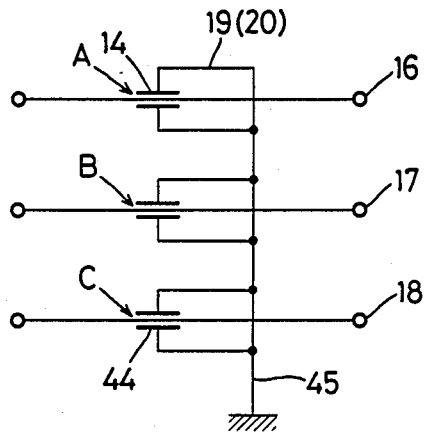
FIG. 11 is an equivalent circuit diagram of the second embodiment in FIG. 10.
Figure 14:
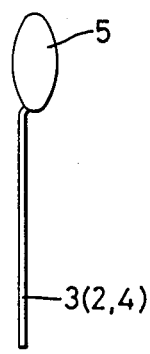
FIG. 14 is a right-hand side front view thereof.
Figure 13:
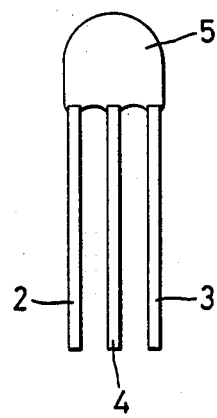
FIG. 13 is a front exterior view of the conventional three-terminal capacitor.
Figure 12:
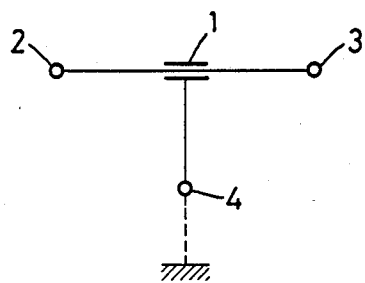
FIG. 12 is a circuit diagram of the conventional three-terminal capacitor.

The above circuit construction, as shown in FIG. 11, is represented by an equivalent circuit of parallel circuit of three terminal capacitors A, B and C, wherein the three-terminal capacitors A, B and C and common electrode 14 and earth electrode 44 are earthed, so that the signal passes between the common electrode 14 and the earth electrode 44 so as to perforate the data electrodes 11, 12 and 13, in other words, the circuit constitution is equivalent to a feedthrough capacitor in a quasi manner. When a signal is input to the data electrodes 11, 12 and 13 at the three-terminal capacitors A, B and C constituted above-mentioned, noises contained in the signal are absorbed by directed to both the common electrodes 14 and earth electrode 44 and eliminated from the signal.

Especially, the three-terminal capacitors A, B and C each have a good eliminating function with respect to high frequency noises.

The second embodiment of the capacitor network disposes the plurality of data electrodes on one surface of dielectric substrate and the common electrode on the other surface of the same, the data electrodes being opposite to the earth electrodes; thereby being equivalent to the feed-through capacitor in a quasi manner so as to enable the effect of noise elimination to be improved. Especially, a good effect is obtainable with respect to high frequency noise elimination.

Thus, the present embodiment can demonstrate not only the essential function as the three-terminal capacitor but also the function as the feed-through capacitor, thereby being further effective in elimination of high frequency noise.

The present invention may be variously modified in a range of principle thereof.

For example, the insulating coating applied onto the dielectric substrate 10, data electrodes 11, 12 and 13, and common electrode 14 at the capacitor network 23 may alternatively be formed of polystyrene or polyethylene.

Also, the arrangement or the number of data electrodes at the capacitor network 23 and that of the data cirucits 42 and 43 and earth conductor 45 at the circuit substrate 41 may of course be properly changeable at need. The capacitor network of the invention is preferable to be of flat package type, and applicable to a dual-in-line configuration.

Furthermore, the earth electrode formed on the circuit substrate is not indispensable to be similar in configuration to the common electrode, but may be divided into two or more when earthed by the earth conductor. In brief, when the capacitor network is mounted on the circuit substrate, the data electrodes need only constitute the electrostatic capacity by the common electrode and earth electrode.

Although several embodiments have been described, they are merely exemplary of the invention and not to be construed as limiting, the invention being defined solely by the appended claims.

I claim:

1. A capacitor network for eliminating noise from a plurality of data signals, said capacitor network comprising:
   a dielectric substrate having spaced opposed first and second major surfaces;
   a plurality of data signal transmitting means for transmitting data signals through said dielectric substrate, and each one of said plurality of data signal transmitting means including:
   (i) a data electrode disposed on said first major surface of said dielectric substrate, and said data electrode having first and second ends;
   (ii) a data input terminal means connected to said first end of said data electrode for inputting a data signal; and
   (iii) a data output terminal means connected to said second end of said data electrode for outputting a data signal;
   a common electrode disposed on said second major surface of said dielectric substrate, and said common electrode being spaced opposed to said plurality of data electrodes;
   at least two ground terminal means connected to said common electrode for connecting said common electrode with a ground; and
   wherein
   (i) said plurality of data input terminal means and at least one of said at least two ground terminal means are integrally formed by a first metal strip material, and said plurality of data output terminal means and at least another one of said at least two ground terminal means are integrally formed by a second metal strip material;
   (ii) said first and second metal strip materials are inserted from both sides of said dielectric substrate for holding said dielectric substrate between said data input and output terminal means and said at least two ground terminal means;
   (iii) each one of said at least two ground terminal means is cut off from its respective metal strip material after one end thereof is fixed to said common electrode; and
   (iv) each one of said at least two ground terminal means includes a long connecting member having first and second ends, said first end of said connecting member being connected to said common electrode, and said second end of said connecting member being connectable to a respective connecting point on a printed wiring substrate.

2. A capacitor network as in claim 1, wherein said dielectric substrate is a ceramic material.

3. A capacitor network as in claim 1, wherein said dielectric substrate is molded from a resin except for open end sides for receiving said terminal means.

4. A capacitor network as set forth in claim 3, wherein said data input and output terminal means and said ground terminal means are bent toward said first major surface of said dielectric substrate on which said plurality of data electrodes are disposed.

5. A capacitor network as in claim 1, wherein said terminal means are connected to said electrodes by soldering.

* * * * *